US010272938B2

(12) United States Patent
Finley

(10) Patent No.: US 10,272,938 B2
(45) Date of Patent: Apr. 30, 2019

(54) SHOPPING CART ACCESSORY POUCH

(71) Applicant: Deborah Finley, Churchville, NY (US)

(72) Inventor: Deborah Finley, Churchville, NY (US)

( * ) Notice: Subject to any disclaimer, the term of this patent is extended or adjusted under 35 U.S.C. 154(b) by 0 days.

(21) Appl. No.: 15/940,076

(22) Filed: Mar. 29, 2018

(65) Prior Publication Data

US 2018/0281837 A1    Oct. 4, 2018

Related U.S. Application Data

(60) Provisional application No. 62/478,842, filed on Mar. 30, 2017.

(51) Int. Cl.
*B60R 7/00*    (2006.01)
*B62B 3/14*    (2006.01)

(52) U.S. Cl.
CPC .................. *B62B 3/1464* (2013.01)

(58) Field of Classification Search
CPC .... B60R 9/00; B60R 7/00; B62B 5/00; B62B 3/1444; B62B 3/1464; B62B 3/1468; B62B 3/1472; B65D 30/32
USPC .......................................... 224/411, 277, 584
See application file for complete search history.

(56) References Cited

U.S. PATENT DOCUMENTS

| | | | | |
|---|---|---|---|---|
| 3,019,953 A | * | 2/1962 | Umanoff | B62B 3/1468 224/411 |
| 3,028,066 A | * | 4/1962 | Bumby | B62B 3/1464 220/23.9 |
| 3,578,380 A | * | 5/1971 | Jacobus | B62B 3/144 297/229 |
| 4,235,331 A | * | 11/1980 | Bates, III | A45C 5/045 206/170 |
| 4,560,096 A | * | 12/1985 | Lucas | B62B 3/1464 220/9.4 |
| 4,666,207 A | * | 5/1987 | Quartano | B62B 3/144 280/33.992 |
| 4,814,806 A | * | 3/1989 | Flax | G03B 17/561 224/908 |
| 4,863,003 A | * | 9/1989 | Carter | A45C 9/00 190/8 |
| 4,871,100 A | * | 10/1989 | Posner | B62B 3/1464 224/411 |
| D306,520 S | * | 3/1990 | McCarthy | D12/133 |
| 4,979,833 A | | 12/1990 | Cook | |

(Continued)

*Primary Examiner* — Brian D Nash
(74) *Attorney, Agent, or Firm* — Global Intellectual Property Agency, LLC; Daniel Boudwin

(57) ABSTRACT

A shopping cart accessory pouch. The device includes a flexible base including a front wall, a rear wall, a pair of sidewalls, and a pair of central dividing walls. The pair of central dividing walls separate an interior of the base into a front compartment and a rear compartment. The pair of central dividing walls defining a central pocket therebetween for receiving thin items such as coupons or other thin objects. A perimeter cord is disposed about an upper perimeter of the base. A plurality of attachment fasteners are removably secured to the perimeter cord, wherein each attachment fastener of the plurality of attachment fasteners is configured to secure the base to a rail of a shopping cart. The device is configured to provide additional storage space that is elevated above the lower surface of the shopping cart, such that additional items may be stored under the pouch.

13 Claims, 5 Drawing Sheets

(56) References Cited

U.S. PATENT DOCUMENTS

| | | | | |
|---|---|---|---|---|
| 5,012,966 A * | 5/1991 | Turner | B62B 3/1472 | 206/556 |
| 5,031,807 A * | 7/1991 | Tiffany | B62J 9/005 | 150/108 |
| 5,050,998 A * | 9/1991 | Wachtel | D06F 95/004 | 150/117 |
| 5,065,919 A * | 11/1991 | Sims | A45F 5/00 | 224/257 |
| 5,118,201 A | 6/1992 | Cook | | |
| 5,203,578 A * | 4/1993 | Davidson | B62B 3/1464 | 206/509 |
| 5,439,154 A * | 8/1995 | Delligatti | A45C 9/00 | 150/106 |
| 5,475,886 A * | 12/1995 | Mintz | A45C 9/00 | 297/188.01 |
| 5,503,476 A * | 4/1996 | Hamdan | D06F 95/002 | 224/585 |
| 5,531,366 A * | 7/1996 | Strom | A45C 1/04 | 224/153 |
| 5,829,835 A * | 11/1998 | Rogers | B62B 3/144 | 297/256.17 |
| 5,938,336 A * | 8/1999 | King | A47C 31/11 | 224/42.11 |
| 5,961,018 A * | 10/1999 | Abelbeck | B62B 3/146 | 224/411 |
| 6,206,224 B1 * | 3/2001 | Potts | B62B 3/1464 | 220/23.86 |
| 6,311,884 B1 * | 11/2001 | Johnson | A45F 3/04 | 224/153 |
| 6,334,562 B1 * | 1/2002 | Ament | B60R 7/005 | 224/404 |
| 6,491,996 B2 * | 12/2002 | Digangi | B32B 27/06 | 428/43 |
| 6,708,819 B1 * | 3/2004 | Lee | B65D 31/12 | 190/13 R |
| 7,036,699 B1 * | 5/2006 | Hay | A61G 5/10 | 224/407 |
| 7,100,982 B2 * | 9/2006 | Lundgren | B62B 3/144 | 280/33.992 |
| 7,163,337 B2 * | 1/2007 | Penson | D06F 95/004 | 383/117 |
| 7,398,977 B2 * | 7/2008 | Short | B62B 3/1464 | 280/33.991 |
| 8,162,331 B2 * | 4/2012 | Simonson | B62B 3/1472 | 280/33.991 |
| 8,807,578 B1 * | 8/2014 | Huguley | B62B 3/1464 | 280/33.992 |
| 8,905,411 B1 * | 12/2014 | Blanton | B62B 3/106 | 280/33.991 |
| D748,884 S * | 2/2016 | Evans | D34/27 | |
| 9,604,757 B2 * | 3/2017 | Spivack | B65D 31/12 | |
| 2008/0083629 A1 * | 4/2008 | Soucie | A45C 3/04 | 206/170 |
| 2009/0080808 A1 | 3/2009 | Hagen | | |
| 2010/0200450 A1 | 8/2010 | Weed | | |
| 2012/0087601 A1 | 4/2012 | Nathan et al. | | |
| 2016/0167689 A1 * | 6/2016 | Haynes | B62B 3/1464 | 224/411 |

\* cited by examiner

SHOPPING CART ACCESSORY POUCH

CROSS REFERENCE TO RELATED APPLICATIONS

This application claims the benefit of U.S. Provisional Application No. 62/478,842 filed on Mar. 30, 2017. The above identified patent application is herein incorporated by reference in its entirety to provide continuity of disclosure.

BACKGROUND OF THE INVENTION

The present invention relates to shopping cart accessory attachments. More specifically, the present invention provides a shopping cart accessory attachment that is configured to secure within a shopping cart in order to provide a convenient storage area with multiple compartments for storing various types of items.

Shopping carts typically include a body formed from interconnected metal rods. The shopping cart typically includes a handle on one end thereof and a main compartment for storing items therein. Most shopping carts also include a child seat that can be retracted against an inner wall of the main compartment or extended outwardly therefrom to a usable working position. While the main compartment provides some storage space for items, there is often a need for additional storage space when individuals are shopping. Additionally, items can pile up within the main compartment where they are unorganized and difficult to sort through. Further, delicate items can be easily crushed or otherwise damaged by heavier objects when multiple types of items are stored in the main compartment.

One way to add additional storage within the shopping cart is to move the child seat adjacent the handle to an open position, such that the child seat can be utilized to support items thereon. However, this prevents individuals shopping with children from using the child seat intended. Further, the extension of the child seat eliminates space within the main interior of the cart, negating the additional support provided by the seat. Additionally, delicate items stored within the child seat often fall into the interior of the cart or out of the cart completely, which can irreparably damage the items. In view of the above concerns, it is desirable to provide a shopping cart accessory pouch that can provide additional, protective storage for additional items, wherein the shopping cart accessory pouch can be adjustably secured to the upper end of the shopping cart without interfering with other components of the shopping cart, such as the handle or child seat.

In light of the devices disclosed in the known art, it is submitted that the present invention substantially diverges in design elements from the known art and consequently it is clear that there is a need in the art for an improvement to existing shopping cart accessory devices. In this regard the present invention substantially fulfills these needs.

SUMMARY OF THE INVENTION

In view of the foregoing disadvantages inherent in the known types of shopping cart accessory attachments now present in the prior art, the present invention provides a shopping cart accessory pouch wherein the same can be utilized for providing convenience for the user by providing additional, elevated storage within a shopping cart. The shopping cart accessory attachment includes a base including a front wall, a rear wall, a pair of sidewalls, and a pair of central dividing walls. The pair of central dividing walls separate an interior of the base into a front compartment and a rear compartment. The pair of central dividing walls defining a central pocket therebetween for receiving thin items such as coupons or other thin objects. A perimeter cord is disposed about an upper perimeter of the base. A plurality of attachment fasteners are removably secured to the perimeter cord, wherein each attachment fastener of the plurality of attachment fasteners is configured to secure the base to a rail of a shopping cart.

One object of the present invention is to provide a shopping cart accessory attachment that is configured to provide additional storage space that is elevated above the lower surface of the shopping cart, such that additional items may be stored under the pouch.

Another object of the present invention is to provide a shopping cart accessory attachment that includes a flap for providing alternative access to one of the storage pockets.

A further object of the present invention is to provide a shopping cart accessory attachment that includes flexible materials so that it can contour to the available space within the shopping cart, and so items can rest securely yet gently within the pockets.

Yet another object of the present invention is to provide a shopping cart accessory attachment that can be adjustable positioned within a shopping cart so as not to interfere with other components of the shopping cart, such as the handle or child seat.

Still a further object of the present invention is to provide a shopping cart accessory attachment that is configured to fold to a bag configuration, wherein an included carrying strap is configured to maintain the accessory attachment in the bag configuration, as well as provide a carrying handle for ease of transport.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
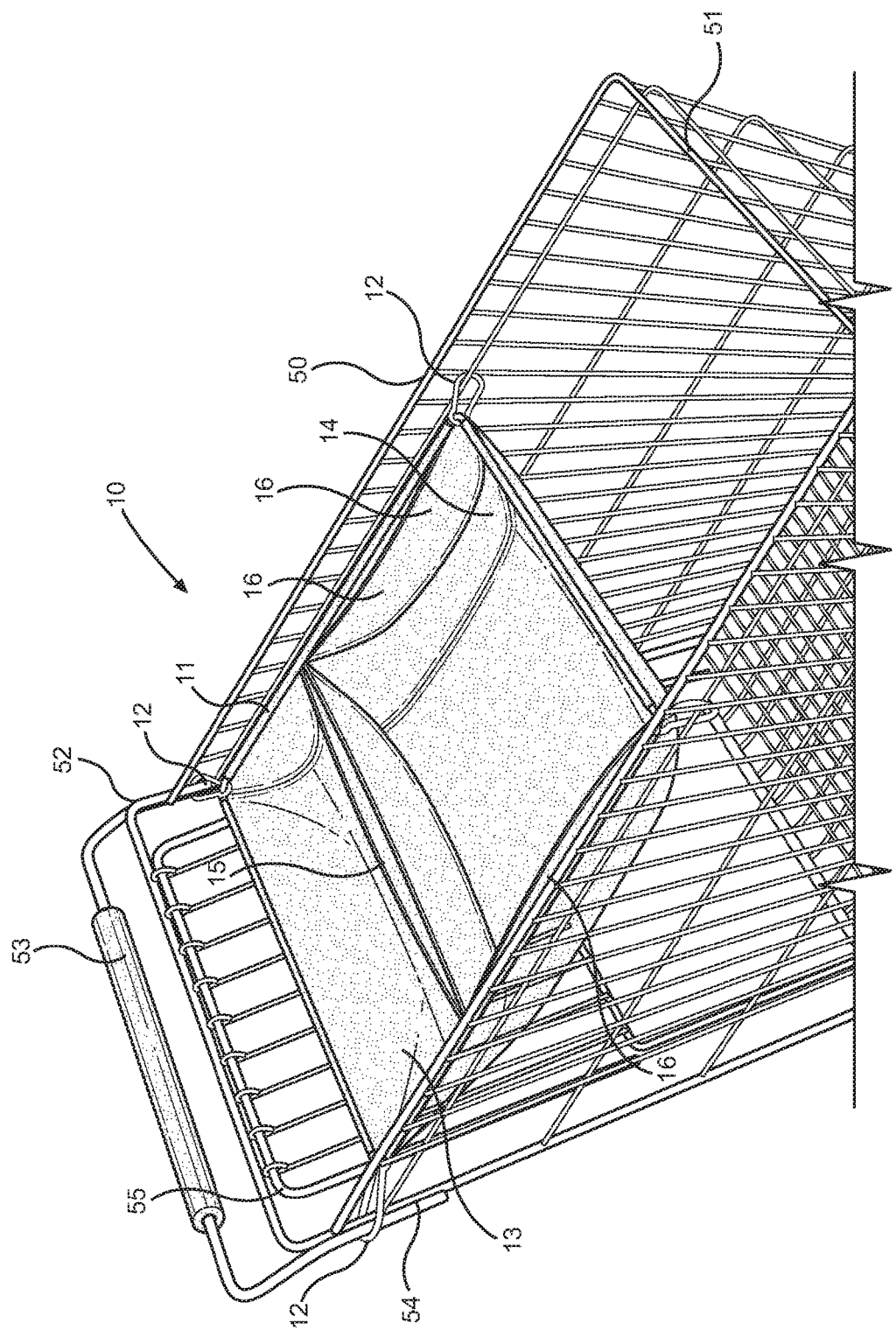
FIG. 1 shows an overhead perspective view of a shopping cart accessory pouch according to the present invention secured within a shopping cart.

Reference is made herein to the attached drawings. Like reference numerals are used throughout the drawings to depict like or similar elements of the shopping cart accessory pouch. For the purposes of presenting a brief and clear description of the present invention, the preferred embodiment will be discussed as used for providing additional, elevated storage within a shopping cart. The figures are intended for representative purposes only and should not be considered to be limiting in any respect.

Referring now to FIG. 1, there is shown an overhead perspective view of a shopping cart accessory pouch according to the present invention secured within a shopping cart. The shopping cart accessory pouch 10 is shown secured within a shopping cart 50. The accessory pouch 10 includes a base including a front wall, a rear wall, a pair of sidewalls, and a pair of central dividing walls that separate the interior of the pouch into a front compartment 14 and a rear compartment 13. As used herein, "rear" refers to the handle end 53 of the shopping cart 50 and "front" refers to the opposing end 51 of the shopping cart 50.

The central dividing walls define a pocket 15 therebetween, such that the pocket 15 is positioned between the front and rear compartments 14, 13. The pocket 15 can be utilized to store objects such as coupons, cell phones, or the like. In the shown embodiment, the accessory pouch 10 includes additional sidewall pockets 16 disposed on the sidewalls thereof. In the shown embodiment, the sidewall pockets 16 are positioned on opposing sides of the front compartment 14. However, in alternate embodiments, the sidewall pockets 16 may be positioned within the rear compartment 13, or within both the front and rear compartments 14, 13.

In the shown embodiment, the front compartment 14 includes an interior volume that is greater than an interior volume of the rear compartment 13, in order to provide different sized compartments for different items. In alternate embodiments, the rear compartment 13 may be larger than the front compartment 14, or the front and rear compartments 13, 14 may be equal in size. Additionally, the accessory pouch 10 is composed of a flexible material, such that the accessory pouch 10 can flex and conform to the objects placed therein.

A perimeter cord 11 is disposed about an upper perimeter of the accessory pouch 10. The perimeter cord 11 includes a plurality of attachment fasteners 12 removably secured thereto. The attachment fasteners 12 are configured to removably secure the perimeter cord 11 to a rail 54 of the shopping cart 50. In some embodiments, the perimeter cord 11 is flexible, which further facilitates the front and rear compartments 14, 13 to flex and conform to the shape of the objects placed therein, provide a continuous support surface regardless of the shape of the object. In alternate embodiments, the perimeter cord 11 is rigid so as to provide a rigid upper support.

One important aspect of the present invention is that the attachment fasteners 12 can be secured to any rail 54 of the shopping cart 50, allowing a user to adjustably position the accessory pouch 10 within the shopping cart 50. For example, in the shown embodiment, the accessory pouch is secured toward the handle end 53 of the shopping cart 50 with the child seat 55 in a retracted, stored position. In alternate embodiments, the accessory pouch 10 can be secured further toward the front end 51 of the shopping cart 50, allowing space for the child seat 55 to extend to the deployed position.

Figure 2:
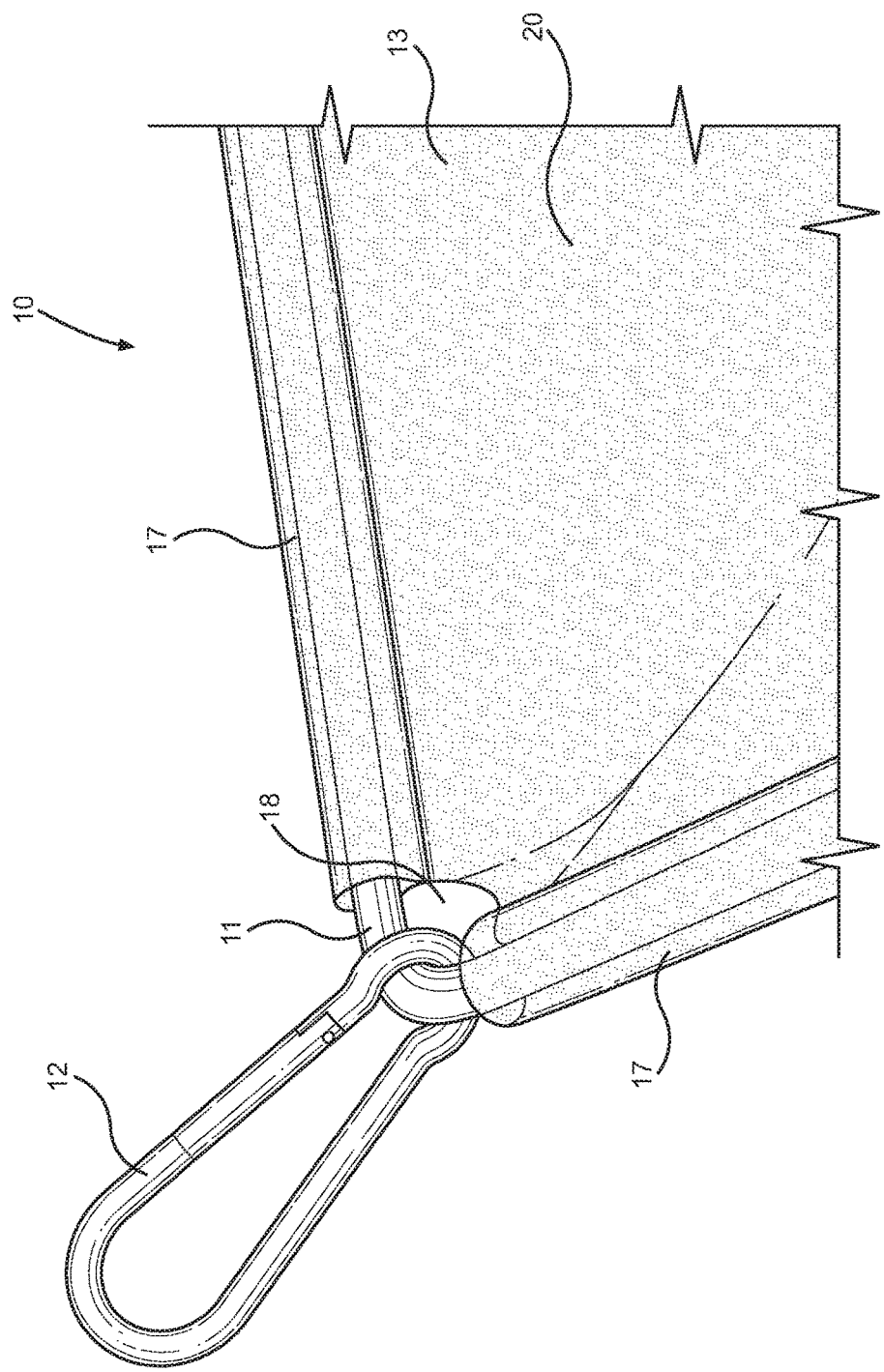
FIG. 2 shows a perspective view of a corner portion of a shopping cart accessory pouch according to the present invention.

Referring now to FIG. 2, there is shown a perspective view of a corner portion of a shopping cart accessory pouch according to the present invention. In the illustrated embodiment, the attachment fastener 12 comprises a carabiner that can be easily connected to and disconnected from a shopping cart rail. However, any suitable attachment fastener 12 may be utilized, such as a strap, a clamp, or the like. The perimeter cord 11 extends through channels 17 disposed on each of the front, rear, and opposing sides of the upper perimeter of the base. The channels 17 keep the perimeter cord 11 connected to the accessory pouch 10. In the shown embodiment, each channel 17 terminates at a corner portion, defining a separating gap 18 between adjacent channels 17. The gap 18 further facilitates bending and flexing of the flexible material 20 of which the accessory pouch 10 is composed.

Figure 3:
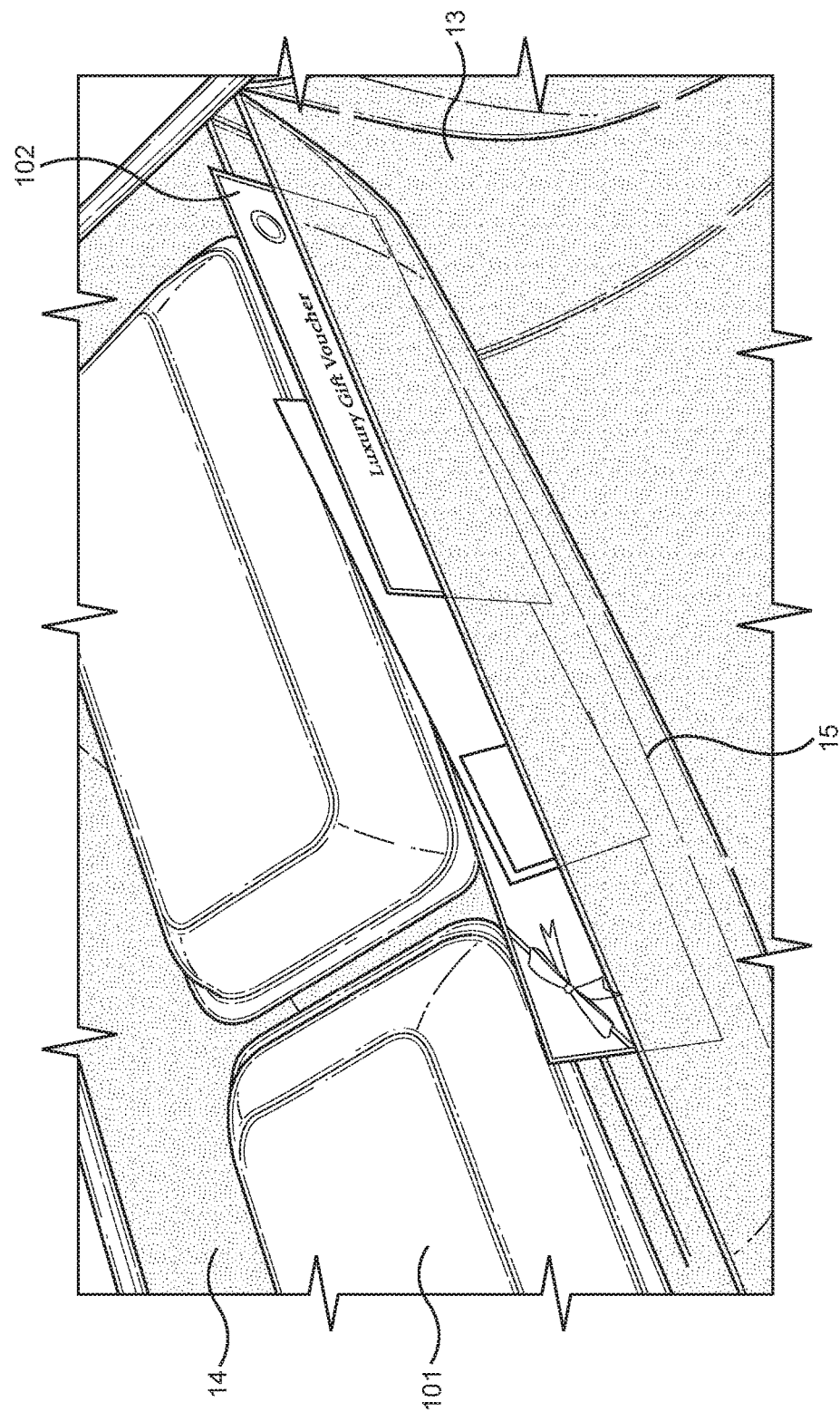
FIG. 3 shows a perspective view of the central pocket of a shopping cart accessory pouch according to the present invention.

Referring now to FIG. 3, there is shown a perspective view of the central pocket of a shopping cart accessory pouch according to the present invention. The central pocket 15 may be utilized to store coupons 102 or other thinner objects that might otherwise be damaged or crushed by heavier items stored within the front and rear compartments 14, 13. In the shown embodiment, the rear compartment 13 is sized to snugly receive at least one of a typical carton of one dozen eggs 101. The walls of the rear compartment 13 contact the carton 101 and help to stabilize the carton 101, preventing damage to the eggs therein.

Figure 4:
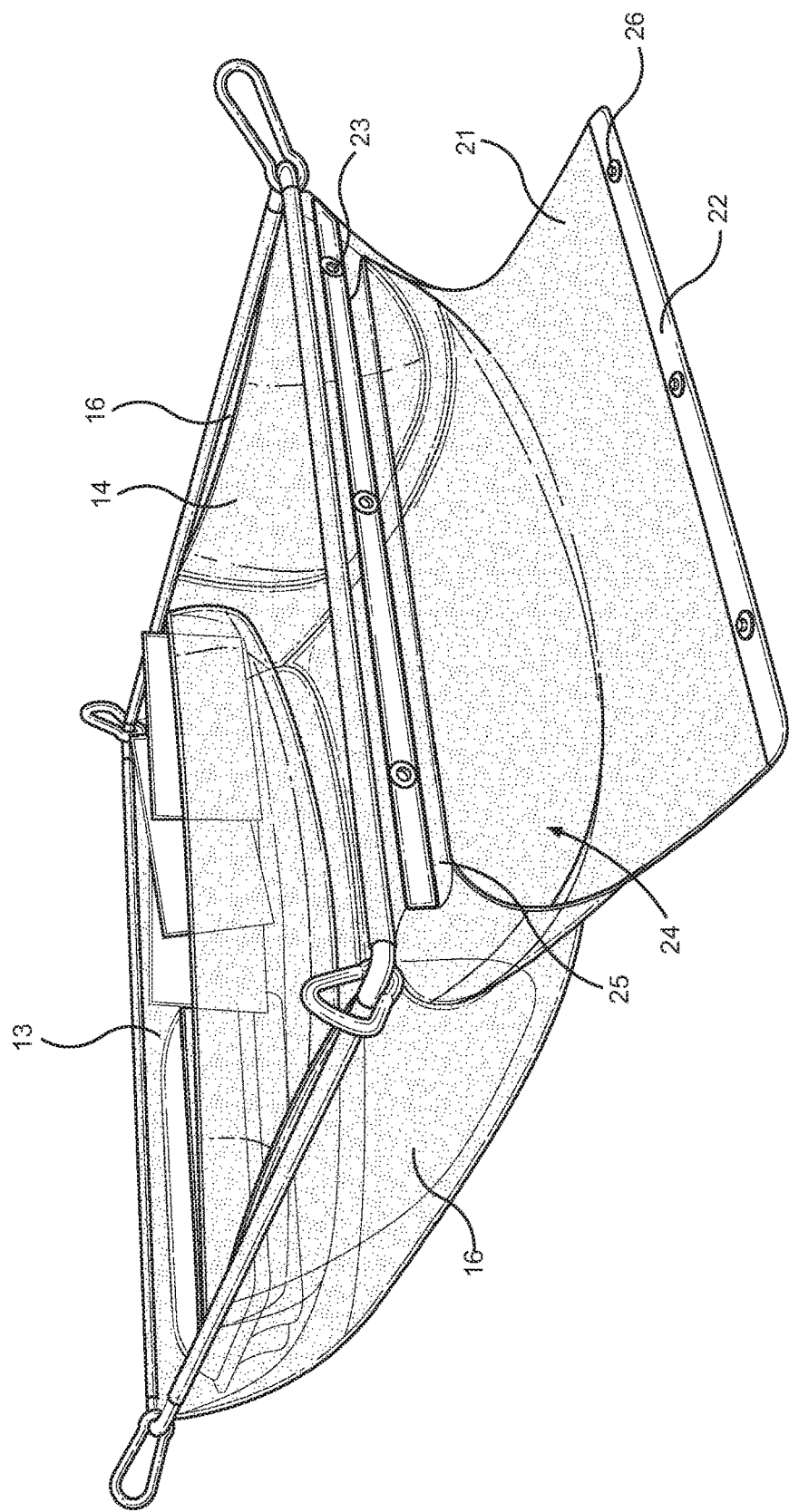
FIG. 4 shows a front perspective view of a shopping cart accessory pouch according to the present invention.

Referring now to FIG. 4, there is shown a front perspective view of a shopping cart accessory pouch according to the present invention. In the shown embodiment, the front compartment 14 of the accessory pouch 10 further includes a flap 21 configured to provide an additional access opening 24 to the front compartment 14. The lower end of the flap 21 is affixed to the lower end of the rear wall, and the upper end 22 of the flap 21 includes one or more closure fasteners 26 thereon. The one or more closure fasteners 26 are configured to secure the upper end 22 of the flap 21 to corresponding fasteners 23 disposed on an upper end 25 of the rear wall. When in a closed position, the flap 21 prevents access through the opening 24. When the flap 21 is in the open position, an individual may reach through the opening 24 to access the contents of the front compartment 14.

In the shown embodiment, the flap 21 is disposed on the front compartment 13. In alternative embodiments, a similar flap 21 can be integrated into the rear compartment 14 for providing selective access thereto. Additionally, alternate embodiments can include a flap 21 that provides selective access to one or more of the sidewall pockets 16. The flap 21 is shown to be monolithic with the front compartment 14 for increased structural soundness, such that the lower end of the flap 21 forms a living hinge with respect to the front compartment. In alternate embodiments, the flap 21 can be a cover that is completely removable from the accessory pouch 10.

Figure 5:
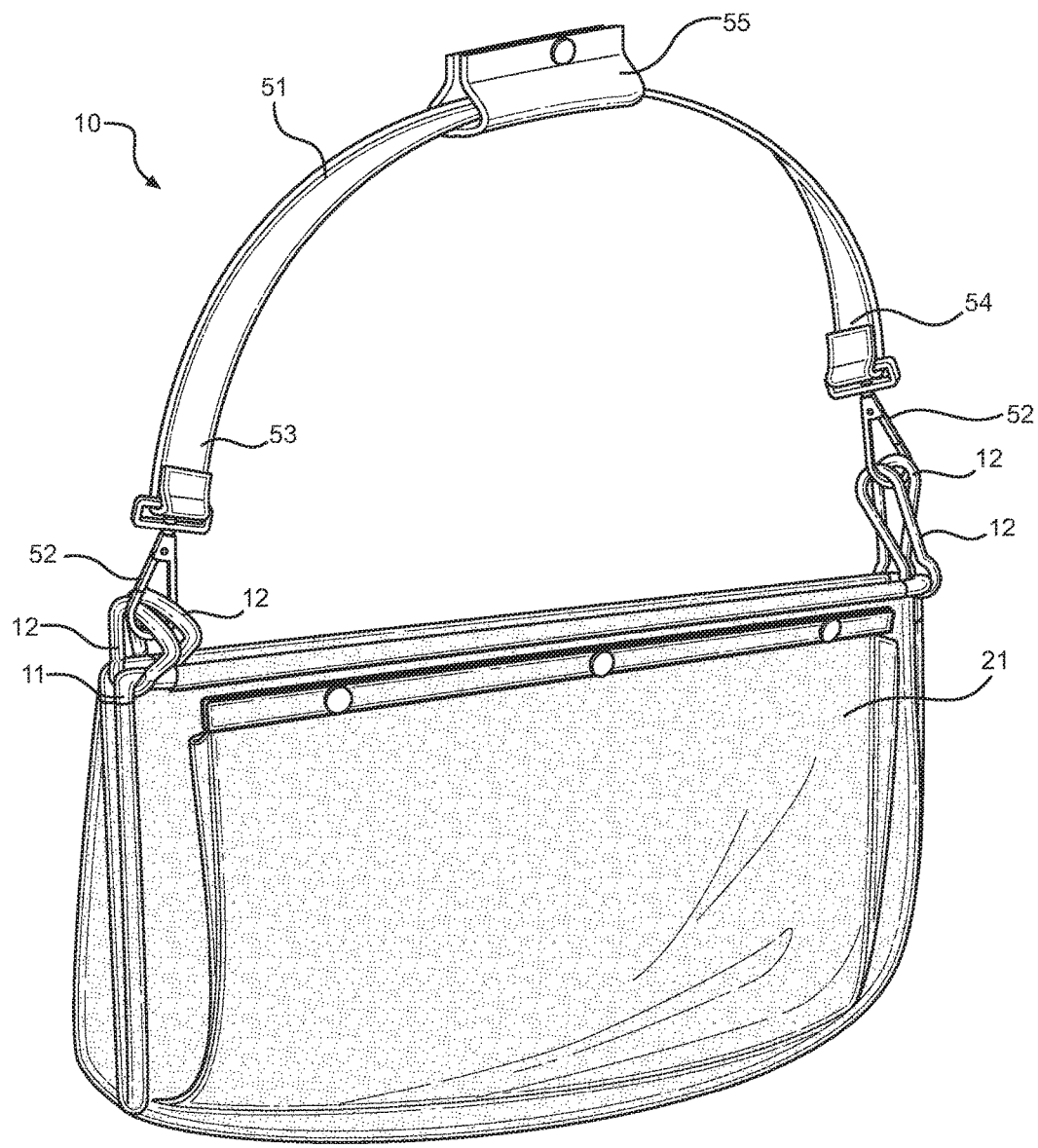
FIG. 5 shows a perspective view of a shopping cart accessory pouch according to the present invention in a bag configuration.

Referring now to FIG. 5, there is shown a perspective view of a shopping cart accessory pouch according to the present invention in a bag configuration. The flexibility of the perimeter cord 11 and the pouch 10 allows the pouch 10 to fold to a bag configuration as desired. While in the bag configuration, the pouch 10 can be easily transported along with any items contained therein. To that end, in some embodiments, the present invention further includes a carrying strap 51 including a first end 53 and an opposing second end 52. The first and second ends 52, 53 of the carrying strap 51 include fasteners 52 thereon that are configured to removably secure the carrying strap 51 to one or more of the attachment fasteners 12 that are otherwise utilized to secure the pouch 10 to a shopping cart. The carrying strap fasteners 52 may be similar in structure to the attachment fasteners 12, or may include a different structure.

When the opposing ends 52, 53 of the carrying strap are each secured to a separate or distinct pair of attachment fasteners 12, the pouch 10 is secured in the bag configuration. The pouch interior can be accessed via an upper opening formed between the folded portions of the pouch 10, or through the flap 21. In the shown embodiment, the carrying strap 51 includes a removable and slidably adjustable handle 55 that can slide along the length of the carrying strap 51. In some embodiments, the carrying strap fasteners 52 are rotatably coupled to the opposing ends 53, 54 of the carrying strap 51, providing further adjustability and ease of transport.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shopping cart accessory pouch, comprising:
   a base including a front wall, a rear wall, a pair of sidewalls, and a pair of central dividing walls, the pair of central dividing walls separating an interior of the base into a front compartment and a rear compartment, the pair of central dividing walls defining a central pocket therebetween;
   a perimeter cord disposed about an upper perimeter of the base;
   a plurality of attachment fasteners removably secured to the perimeter cord, wherein each fastener of the plurality of attachment fasteners is configured to secure the base to a rail of a shopping cart;
   wherein the front wall includes a flap thereon having a lower end hingedly affixed to a lower end of the front wall and an upper end including one or more closure fasteners thereon, the one or more closure fasteners configured to removably secure the flap to an upper end of the front wall.

2. The shopping cart accessory pouch of claim 1, further comprising a side pocket disposed on each sidewall of the pair of sidewalls.

3. The shopping cart accessory pouch of claim 2, wherein each side pocket is disposed within the front compartment.

4. The shopping cart accessory pouch of claim 1, wherein each attachment fastener of the plurality of attachment fasteners comprises a spring clip.

5. The shopping cart accessory pouch of claim 1, wherein the base is composed of a flexible material.

6. The shopping cart accessory pouch of claim 1 wherein the perimeter cord is flexible.

7. The shopping cart accessory pouch of claim 1, wherein the perimeter cord is rigid.

8. The shopping cart accessory pouch of claim 1, wherein the perimeter cord extends through one or more channels disposed on the upper perimeter of the base, the one or more channels each including a pair of opposing open ends.

9. The shopping cart accessory pouch of claim 8, wherein the one or more channels includes a first channel disposed on the front side of the base, a second channel disposed on the rear side of the base, a third channel disposed on a first sidewall of the pair of sidewalls, and a fourth channel disposed on a second sidewall of the pair of sidewalls, wherein the upper perimeter includes a plurality of corner portions, wherein each corner portion defines a gap that separates adjacent channels of the one or more channels.

10. The shopping cart accessory pouch of claim 1, wherein the flap is monolithic with the front wall.

11. The shopping cart accessory pouch of claim 1, further comprising a carrying strap including a pair of opposing ends each having a carrying strap fastener thereon, wherein each carrying strap fastener is configured to removably secure to at least one of the plurality of attachment fasteners.

12. The shopping cart accessory pouch of claim 11, wherein the carrying strap is configured to secure the shopping cart accessory pouch in a folded bag configuration when each carrying strap fastener is secured to a distinct pair of attachment fasteners of the plurality of attachment fasteners.

13. A shopping cart accessory pouch, comprising:
   a base including a front wall, a rear wall, a pair of sidewalls, and a pair of central dividing walls, the pair of central dividing walls separating an interior of the base into a front compartment and a rear compartment, the pair of central dividing walls defining a central pocket therebetween;
   a perimeter cord disposed about an upper perimeter of the base;
   a plurality of attachment fasteners removably secured to the perimeter cord, wherein each fastener of the plurality of attachment fasteners is configured to secure the base to a rail of a shopping cart; and
   a side pocket disposed on each sidewall of the pair of sidewalls.

* * * * *